United States Patent [19]
Glaser

[11] Patent Number: 5,939,636
[45] Date of Patent: Aug. 17, 1999

[54] PRESSURE SENSOR

[75] Inventor: Josef Glaser, Graz, Austria

[73] Assignee: AVL List GmbH, Graz, Austria

[21] Appl. No.: 08/922,560

[22] Filed: Sep. 3, 1997

[30] Foreign Application Priority Data

Sep. 6, 1996 [AT] Austria ..................................... 158096

[51] Int. Cl.⁶ ..................................................... G01L 7/00
[52] U.S. Cl. ............................................................. 73/706
[58] Field of Search ........................... 73/152.12, 152.13,
73/152.19, 152.22, 152.23, 152.51, 152.52,
152.53, 706

[56] References Cited

U.S. PATENT DOCUMENTS 5,471,882  12/1995  Wiggins ................................ 73/152.52

Primary Examiner—William Oen
Attorney, Agent, or Firm—Watson Cole Grindle Watson, P.L.L.C.

[57] ABSTRACT

The service life of a sensor for the measurement of pressure in hot media which can be inserted in a measurement bore and which is provided with a force-, tension- or displacement-measuring sensor element as well as with a sensor membrane, which is connected with the sensor casing in a gas-tight manner and comprises a heat-insulating, flexible coating, is increased in such a way that the pressure sensor comprises a screen-like thermal protection element which is arranged at a small distance from the coating of the sensor membrane and rests on the sensor casing.

10 Claims, 1 Drawing Sheet

PRESSURE SENSOR

BACKGROUND OF THE INVENTION

The invention relates to a sensor for the measurement of pressure in hot media which can be used in a measurement bore and which is provided with a force-, tension- or displacement-measuring sensor element which can preferably be charged with a cooling medium as well as with a sensor membrane which is connected with the sensor casing in a gas-tight manner and comprises a heat-insulating, flexible or flexurally soft coating.

DESCRIPTION OF THE PRIOR ART

Sensors for the pressure measurement in hot processes are frequently subjected to extreme heat flows. These heat flows lead to very high temperatures in the sensor, which as a result of the change in the geometry and the material behaviour can lead to the deterioration of the measuring properties or even to the destruction of the sensor.

In many cases complex measures are necessary in order to carry off the quantity of heat that has entered the sensor, which can be achieved, for example, by direct liquid cooling.

A number of negative influences of the heat flows on the sensor cannot be eliminated even by direct liquid cooling such as the dynamic changes in the heated sensor surfaces, such as the sensor membrane, which occur in connection with the dynamic heat flows. Particularly during measurements in the combustion chambers of engines the deformations of the sensor membrane can lead to measurement errors (temperature drift or thermal shock).

In order to avoid these negative influences it is already known to apply heat-insulating coatings on the heated sensor elements so as to protect the sensor itself in this way from too high temperatures and too large temperature fluctuations. Temperature fluctuations in the coating hardly cause any reactions on the result of the measurement owing to the softness of the material used (e.g. silicone caoutchouc).

Unfortunately, all currently available coatings fail under the high heating of the sensor after a relatively short period of time, e.g. such as occurs in the combustion engine.

SUMMARY OF THE INVENTION

It is the object of the present invention to further develop a sensor of the kind mentioned above in such a way that the service life is substantially extended, e.g. during measurements in the combustion engine.

This object is achieved in accordance with the invention in such a way that the pressure sensor is provided with a screen-like thermal protection element which is arranged at a small distance from the coating of the sensor membrane and rests on the sensor casing. The sensor is thus provided in addition to the heat-insulating, flexurally soft coating, which at least protects the sensor membrane and optionally also further temperature-sensitive elements, with a thermal protection element which protects the coating from excessively high heat flows. The screen-like thermal protection element consists of a favourably heat-conductive material and is arranged relatively massively.

In accordance with the invention the thermal protection element is provided with a plurality of bores which are parallel to the sensor axis. As a result of the small distance to the coating and the numerous openings, only little pressure medium has to be conveyed, so that even in the case of rapid changes in pressure a practically undelayed pressure build-up on the actual measuring element of the sensor is guaranteed. Slot-like openings which are arranged radially or parallel and can be combined with bores are also possible.

The massive, favourably heat-conductive arrangement of the thermal protection element leads to the effect that already much heat can be drained from the pressure medium reaching the coating of the sensor membrane and that therefore less quantity of heat can be conveyed to the coating. This leads to a decisive advantage as compared with previous arrangements, namely to the substantially improved service life in very hot pressure media as compared with unprotected coatings, without having to take into account any substantial disadvantages in the pressure measurement.

The effect of the screen-like thermal protection element is improved when it is connected in a favourably conductive manner with the cool zones of the sensor or the installation location. It is provided in particular that the thermal protection element rests on a cooled location of the sensor casing which is disposed at a distance from the coated hot sensor member which is subjected to high heat flows and/or can be brought into thermal contact with the cool wall of the measurement bore after the installation of the sensor.

The thermal protection element need not be mounted on the sensor per se, but can be clamped between the sensor and a shoulder of the measurement bore during the mounting of the sensor, for example. The thermal protection element is preferably arranged in an exchangeable manner so as to easily remove any soiling in the gap between the thermal protection element and the coating or to allow a simple renewal of the coating.

In a first embodiment of the invention it is provided that the thermal protection element is arranged in a pot-like manner, it is provided with a floor zone as well as a cylindrical wall zone adjacent to the same which is attached to the sensor casing and that the thermal protection element, after the installation of the sensor in the measurement bore, rests in a shoulder-sealing manner on the set-off of the measuring bore by way of a radially projecting shoulder of the cylindrical wall zone.

In a further variant of the invention it is provided that the coated sensor membrane is encompassed by a cylindrical collar of the sensor casing which is used for receiving the thermal protection element and that the thermal protection element is provided with a flange which rests on the collar of the sensor casing and rests in a head-sealing manner on a set-off of the measurement bore after the installation of the sensor in the measurement bore.

In the case of the pot-like arrangement of the thermal protection element in particular it can be screwed together with the sensor casing. It is also possible, however, that the thermal protection element is attached to the sensor casing by snug fit.

BRIEF DESCRIPTION OF THE DRAWINGS

The invention will be explained below in greater detail by reference to embodiments.

DETAILED DESCRIPTION OF PREFERRED EMBODIMENTS

Figure 1:
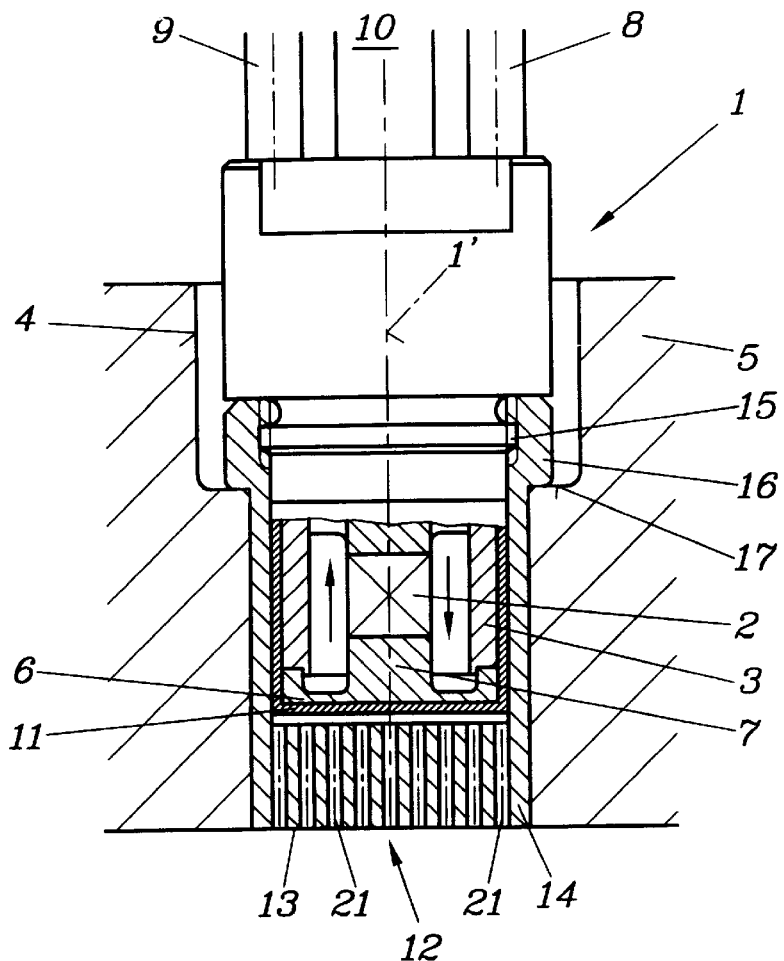
FIG. 1 shows a sensor in accordance with the invention in a longitudinal section and FIG. 2 an embodiment of the sensor in accordance with the invention also in a longitudinal section.

The sensor 1 shown in FIG. 1 is provided with a sensor element 2 which measures forces, tensions or displacements and is arranged in the sensor casing 3. The sensor 1 can be inserted in a measurement bore 4 of a mounting location 5 which is not shown here in greater detail. The sensor casing 3 is sealed in a gas-tight manner with a sensor membrane 6 in the direction towards the hot pressure medium. The membrane 6 acts on the sensor element 2 by way of a pressure stamp 7 for example. Furthermore, the sensor is supplied with a cooling medium by way of a feed line 8 and a discharge line 9, with the electrical connections 10 being arranged between the two lines 8 and 9. The sensor membrane 6 is provided with a coating 11 on the side facing the hot pressure medium, which coating is made from a soft, flexible, temperature-stable material such as a coating made from silicone caoutchouc. As is shown in FIG. 1, the soft heat-insulating coating 11 can also cover the entire measuring element of sensor 1. A screen-like thermal protection element 12, which is made from a favourably heat-conductive material, is arranged at a small distance in front of this coating 11.

The thermal protection element 12 pursuant to FIG. 1 is arranged in a pot-like manner and is provided with a floor zone 13 as well as cylindrical wall zone 14 which is adjacent to the same. The fastening on the sensor can be made by an inner thread 15 on the cylindrical wall zone 14 of the thermal protection element 12 for example. The cylindrical wall zone 14 is provided with a shoulder 16 which projects radially outwardly and rests on a set-off 17 of the measurement bore 4 after the installation of the sensor in the measurement bore 4. In this way the thermal protection element 12 is in contact with a relatively cool zone of the installation location 5, which leads to the rapid discharge of the heat from the thermal protection element to the installation location. This is particularly important for sensors which do not have their own cooling. In the case of direct sensor cooling (e.g. interior cooling of the sensor, as is shown in FIG. 1) the heat discharge into the sensor casing is usually more effective.

Figure 2:
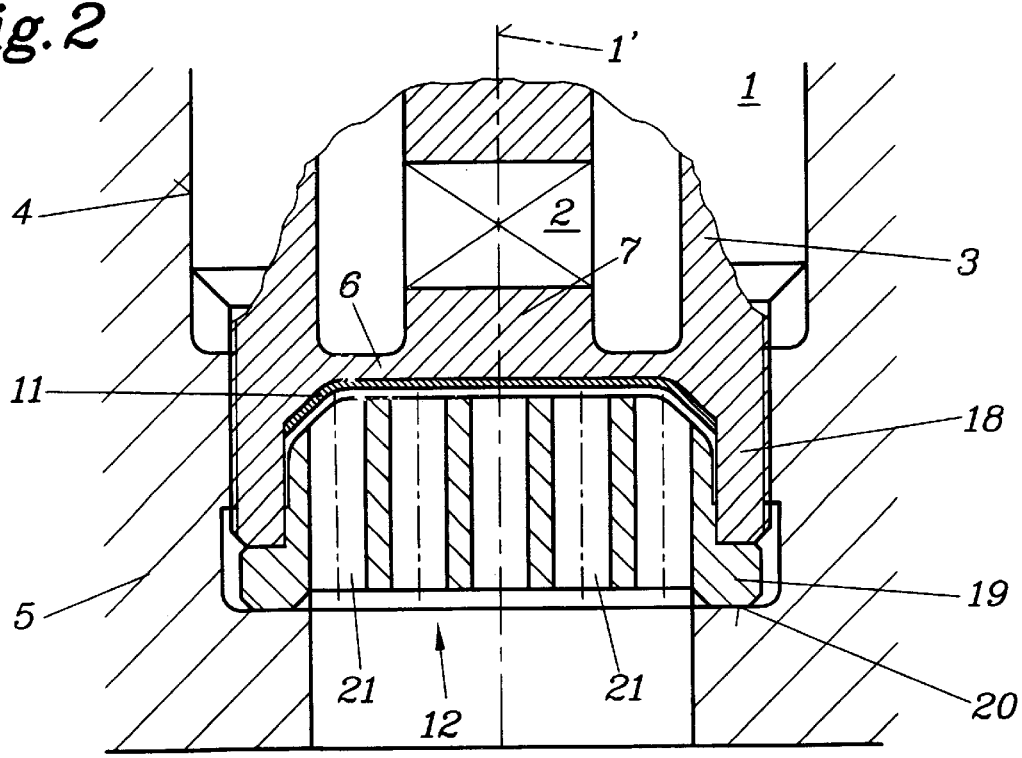

In the embodiment pursuant to FIG. 2, in which the same parts are provided with the same reference numerals, the sensor membrane 6 which is provided with the coating 11 is encompassed by a cylindrical collar 18 of the sensor casing 3. The interior of the cylindrical collar 18 is used for receiving the thermal protection element 12, with a radially outwardly projecting flange 19 of the thermal protection element 12 resting on the cylindrical collar 18 of the sensor casing 3. After the installation of the sensor 1 in the measurement bore 4 the flange 19 rests in a head-sealing manner on a set-off 20 of the measurement bore 4. This also ensures in this embodiment the favourable thermal linkage of the thermal protection element 12 with the installation location 5. The thermal protection element 12 can be attached by means of snug fit to the inner surface of the cylindrical collar 18 for example.

The screen-like thermal protection element 12 is provided in both embodiments with a plurality of bores 21 which are parallel to the sensor axis 1'. The diameter and the number of the bores 21 is to be chosen in such a way that even in the case of rapid changes of pressure or short pressure pulses there is a practically loss-free charging of the sensor membrane 6.

It is understood that also any other embodiments of the screen-like thermal protection elements would be suitable which are provided with parallel or radially arranged slot-like openings for example, if notice is given to a sufficiently favourable radial heat conductivity and a low flow resistance.

I claim:

1. A sensor for pressure measurement in hot media, which is insertable in a measurement bore and is provided with a sensor element as well as a sensor membrane with a heat-insulating, flexible coating, which membrane is connected with the sensor casing in a gas-tight manner wherein said pressure sensor comprises a screen-like thermal protection element which is arranged at a small distance from said flexible coating of said sensor membrane and rests on said sensor casing.

2. A sensor as claimed in claim 1, wherein said thermal protection element rests on a cooled location of said sensor casing which is disposed at a distance from the coated hot sensor membrane which is subjected to high heat flows.

3. A sensor as claimed in claim 1, wherein said thermal protection element is brought into thermal contact with the cool wall of said measurement bore after the installation of said sensor.

4. A sensor as claimed in claim 2, wherein said thermal protection element is arranged in a pot-like way, is provided with a floor zone as well as a cylindrical wall zone adjacent to the same which is attached to said sensor casing and wherein said thermal protection element, after the installation of said sensor in said measurement bore, rests on a set-off of said measurement bore in a shoulder-sealing manner by way of a radially projecting shoulder of said cylindrical wall zone.

5. A sensor as claimed in claim 3, wherein said coated sensor membrane is encompassed by a cylindrical collar of said sensor casing which is used for receiving said thermal protection element and wherein said thermal protection element is provided with a flange which rests on said collar of said sensor casing and rests in a head-sealing manner on a set-off of said measurement bore after the installation of said sensor in said measurement bore.

6. A sensor as claimed in claim 1, wherein said thermal protection element is provided with a plurality of bores which are parallel to the sensor axis.

7. A sensor as claimed in claim 1, wherein said thermal protection element is screwed together with said sensor casing.

8. A sensor as claimed in claim 1, wherein said thermal protection element is attached by means of snug fit on said sensor casing.

9. A sensor as claimed in claim 1, wherein said sensor element is a force-, tension-, or displacement measuring element.

10. A sensor as claimed in claim 1, wherein said sensor element is charged with a cooling medium.

\* \* \* \* \*